Patented Nov. 12, 1935

2,020,703

UNITED STATES PATENT OFFICE 2,020,703

IMPROVED HYDROCARBON PRODUCTS, ESPECIALLY LUBRICATING OILS

Curt Schumann, Eduard Muench, and Hanns Ufer, Ludwigshafen-on-the-Rhine, Germany, assignors to I. G. Farbenindustrie Aktiengesellschaft, Frankfort-on-the-Main, Germany No Drawing. Application October 23, 1933, Serial No. 694,882. In Germany October 11, 1932

5 Claims. (Cl. 87—9)

The present invention relates to improved hydrocarbon products and more particularly lubricating oils, and to a process of making such products.

We have found that the properties of hydrocarbon products, especially of lubricating oils but also of lubricating greases, benzines, paraffin waxes and the like, are improved to a surprising extent by incorporating therewith polymerization products of vinyl ethers of unsaturated alcohols, if desired together with or in admixture with polymerization products of vinyl ethers of saturated alcohols and/or further additions.

The ready-made polymerization products of vinyl ethers, as for example those obtainable by polymerization with boron fluoride, boron fluoride addition compounds, as for example the addition compound of boron fluoride and ether, zinc chloride, or peroxides, with or without the addition of diluents, may be employed, or the monomeric vinyl ether may be mixed with a part of the hydrocarbon product the properties of which are to be improved, or with the whole of it, the polymerization then being carried out in this mixture. The polymerization is usually carried out at temperatures below 250° C., preferably below 100° C. The polymerization products have a high molecular weight, usually of at least 1000 and preferably much higher. The polymerizing agent and undesirable by-products may be removed by subsequent refining. Depending on the desired effect and on the nature of the hydrocarbons to be improved, single polymerized vinyl ethers of unsaturated alcohols or mixtures thereof or polymerization products of mixtures of vinyl ethers may be employed. Mixtures of polymerized vinyl ethers of unsaturated alcohols with those of saturated alcohols or polymerization products of mixtures of vinyl ethers of saturated alcohols with those of unsaturated alcohols have proved very advantageous and in such mixtures the ethers of saturated alcohols may even predominate, provided the ethers of unsaturated alcohols are present in an amount of at least 10 per cent, in order to obtain products efficient for reducing the pour point. For example vinyl ethers of industrial alcohols which contain mainly saturated alcohols and also some unsaturated alcohols may be employed.

The said additions lower the setting point of lubricating oils quite considerably, improve their lubricating power and act favorably on the viscosity index, generally speaking. Consistent fats from lubricating oils which contain the said additions are strong good-adhering lubricants, which are usually soft even at low temperatures.

In most cases it is sufficient to add the polymerized vinyl ethers of the unsaturated alcohols in an amount of a fraction of a per cent, but more, for example up to 10 per cent or still more, may be added. For each particular lubricating oil the particularly favorable polymerized vinyl ether and the particularly favorable method of polymerization may be readily ascertained by a simple preliminary test.

As further additions to the said polymerized vinyl ethers, in cases when such further additions are desirable, may be mentioned other substances which improve lubricating oils, as for example other substances which lower the setting point or other organic substances of high molecular weight, such as polymerization products of isoolefines.

The following examples will further illustrate the nature of this invention but the invention is not restricted to these examples.

Example 1

The vinyl ether of the oleic alcohol obtainable from sperm oil is polymerized in known manner (see for example the British Specification No. 378,544) at about 50° C. by the addition of small amounts of boron fluoride or a dilute solution of the addition compound of boron fluoride and dibutyl ether in dibutyl ether. A somewhat yellowish liquid having a viscosity of about 50° Engler at 100° C. is obtained. The effect of the addition of the said polymerization product to mineral lubricating oils may be seen from the following table.

|  | Viscosity in ° Engler at | | Setting point in ° C. | Viscosity index |
|---|---|---|---|---|
|  | 38° C. | 99° C. | | |
| Mineral lubricating oil of German origin | 11.2 | 1.74 | 1° | 70. |
| The same with 0.1 per cent of the said product |  |  | −25° | About 80. |
| The same with 0.3 per cent of the said product | 11.89 | 1.80 | −25° | About 80. |
| The same with 1.0 per cent of the said product | 12.44 | 1.83 | −27° | About 82. |
| The same with 1.0 per cent of the said product after heating to 300° C. for 3 minutes | 12.44 | 1.83 | −28° | About 82. |
| Pennsylvanian mineral oil |  |  | −4° |  |
| The same with 1.0 per cent of the said product |  |  | −34° to −38° |  |

Example 2

150 grams of the vinyl ether of a cetyl alcohol, which by reason of its content of unsaturated alcohols has an iodine value of from 15 to 20, are well mixed while warming gently with 350 grams of a mineral lubricating oil of German origin the properties of which are to be improved. The vinyl ether is then polymerized within the mixture by the addition of very small amounts of boron fluoride-dibutyl ether addition compound. The commencement of the polymerization may be detected by the increase in temperature. The greater part of the heat of reaction is withdrawn by good stirring in a bath at from 30° to 50° C. so that increases of temperature above from 60° to 70° C. are avoided. When the reaction is completed (which may be detected by the fact that when fresh amounts of boron fluoride are added to a sample no further increase in temperature takes place) the mixture is allowed to stand for some time at room temperature, washed with dilute caustic soda and several times with hot water and dried in vacuo at about 100° C.

An oil is obtained which in appearance is very similar to the mineral lubricating oil employed but has a somewhat higher viscosity. The effect of the said polymeric vinyl ethers is shown in the following table:

|  | Setting point in ° C. | Viscosity index | Lubricating circulation time minutes | Power temperature |
|---|---|---|---|---|
| Mineral lubricating oil of German origin | 1° | 70 | 57 | 101° |
| The same with 0.3 per cent of the said product | −24° |  |  |  |
| The same with 0.5 per cent of the said product | −23° |  |  |  |
| The same with 1.0 per cent of the said product | −25° |  |  |  |
| The same with 3.0 per cent of the said product | −15° | About 100 | 62 | 101° |

The lubricating power is measured by means of the Suthau test machine.

Instead of carrying out the polymerization of the vinyl ether in the oil the properties of which are to be improved, it may be carried out in other suitable oils, as for example in those which behave favorably as regards the setting point, and may also be carried out in other relative proportions.

The setting point may be still further improved by the admixture of further substances which lower the setting point. Thus for example by adding 1 per cent of the said polymerization product and 1 per cent of a product prepared according to the British specification No. 349,071 to the said mineral oil, a setting point of 31° below zero C. is obtained. The properties of the oil may be still further improved by the addition of suitable highly polymerized substances, as for example isobutylene polymerization products or of a product obtained by the voltolization of waxy substances such as paraffin wax.

Instead of the cetyl ether containing small amounts of unsaturated alcohols, other analogous mixtures of ethers may be employed; such mixtures may also be prepared by mixing vinyl or polymerized vinyl ethers of unsaturated alcohols with those of saturated alcohols and if desired further additions depending on the desired effect.

Example 3

The vinyl ether of an oleic alcohol having an iodine number between 60 and 65 is heated in a stirring vessel to a temperature between 25° and 50° C. and then has added thereto so much of gaseous boron fluoride which is diluted with nitrogen or carbon dioxide or another inert gas or of boron fluoride dissolved in a suitable solvent until the polymerization begins which may be perceived by an increase in the temperature. The reaction is moderated by cooling and intensive mixing. A too strong rise in temperature, especially such as gives rise to a dark coloration of the materials under treatment, as well as the addition of too large amounts of boron fluoride should be avoided. The polymerization is complete if a sample when mixed with further amounts of boron fluoride shows no or at the most a slight increase in temperature. If still further amounts of the said vinyl ether are to be polymerized these are allowed to slowly flow, if desired with an addition of further amounts of boron fluoride, into the wholly or partly polymerized mixture. In this manner the temperature may be maintained at the desired height, even when working up larger amounts.

The polymerization product thus obtained may be used without further operation for improving hydrocarbon products, especially lubricating oils. In cases products are required which are very pure and odorless and the aqueous extracts of which are entirely free from acids, the polymerization product may be purified by a subsequent treatment with steam, hot water or with dilute aqueous caustic alkali and subsequently with hot water. In this manner usually also the stability of the not diluted polymerization products at higher temperatures (for example at between 250° and 320° C.) is increased. The effect of the additions on the setting point and on the viscosity of the oils is about the same with purified as with not purified products, as is also the stability of the oil mixtures to elevated temperatures.

The single results are given in the following tables. (The viscosity at lower temperatures was determined in a wide capillary according to Ubbelohde).

|  | Setting point in degrees C. | Viscosity indicated by the seconds of the duration of outflow under a water column of 600 millimeters height at a temperature in degrees C. of | | | | |
|---|---|---|---|---|---|---|
|  |  | 10 | 0 | −5 | −10 | −15 |
| Mixture of a mineral lubricating oil of German origin with 10 percent of synthetically prepared oils | −2 | 25.8 | 173 | (1) | (1) | (1) |
| The same with 0.3 percent of the said product | −25 | 22.0 | 68.5 | 156 | 332 | 712 |
| The same with 0.5 percent of the said product | −30 | | | | | |
| The same with 1.0 percent of the said product | −30 | 24.4 | 81.8 | 150 | 306 | 631 |
| Pennsylvania mineral oil having a viscosity at 50° C. of 10.0° Engler | −5 | 28.7 | 95 | (2) | (2) | (2) |
| The same with 0.3 percent of the said product | −24 | | | | 425 | 945 |
| The same with 0.5 percent of the said product | −25 | 26.7 | 64.2 | 182.1 | 346 | 938 |
| The same with 1.0 percent of the said product | −25 | 29.7 | 74.1 | 149.6 | 319 | 812 |

1 Not determinable since the mixture is solid.
2 Not determinable since the oil is solid.

The above table shows that even in the case of heavy summer oils rich in paraffin wax a favorable viscosity at very low temperatures is obtained by small additions of the products according to the present invention. In this manner an expensive dewaxing in which ordinarily also the constituents having lubricating properties are removed, as is usually effected in order to obtain oils having lower setting points, may be dispensed with. If desired, oils free from paraffin wax may be mixed with suitable amounts of paraffin wax and then one of the aforesaid substances lowering the setting point may be added. In this manner lubricating oils having a low setting point and nevertheless a high viscosity index are obtained.

The lubricating oils which are improved by the addition of the said polymerization products are very stable to high temperatures. Even when heated for several hours to a temperature of 320° C. the setting point of the improved lubricating oils is not materially affected and they give a clear solution in ordinary benzine.

Similar results are obtained if other polymerized vinyl ethers of unsaturated alcohols or mixtures of polymerization products of the said vinyl ethers with other, preferably polymerized, products or polymerization products of mixtures of the said vinyl ethers with other, preferably polymerizable, substances are employed. Thus polymerization products of mixtures of vinyl ethers of unsaturated alcohols with those of saturated alcohols or with other polymerizable or not polymerizable substances, such as with castor oil miscible with mineral oils, or dioleylketone, methyl-oleyl-ketone, the glycol ester of ricinoleic acid, the oleic acid ester of methyl glycol or similar compounds containing oxygen or polymerization products thereof, or hydrocarbons, such as oil fractions or oil residues or naphthalene may be employed. The said substances may be added to the vinyl ethers of unsaturated alcohols to be polymerized in different amounts and in the presence or absence of diluents. The polymerization of the vinyl ethers together with the other substances may also be effected in the hydrocarbon oils to be improved. Mixtures of polymerization products of vinyl ethers of unsaturated alcohols with other polymerization products sometimes are not as advantageous as are polymerization products of the mixtures of said vinyl ethers with the corresponding monomeric compounds.

The effect of the aforesaid additional substances on the characteristics of a German mineral oil having a viscosity of 6.5° Engler at 50° C. may be seen from the following table. The viscosity of the oil in this case is indicated by the times in seconds within which a polished ball of steel having a diameter of 14.2 millimeters falls through a layer of the said oil 250 millimeters in height, said oil being filled in an upright glass tube having an inner diameter of 30 millimeters.

| Additions to the mineral oil | Setting point in degrees C. | Times of fall in seconds at the following temperatures in degrees C. | | |
|---|---|---|---|---|
|  |  | −10 | −15 | −20 |
| No addition | +2 | Ball does not fall | | |
| 0.1 percent of the polymerization product of the vinyl ether of an oleic alcohol from sperm oil | −20 | About one hour. | Ball does not fall | |
| 0.2 percent of the same product | −23 | 30 | 260 | 900 |
| 0.5 percent of the same product | −29 | 12 | 25 | 50 |
| 1.0 percent of the same product | −30 | 8 | 17 | 34 |
| 0.1 percent of a polymerization product of a mixture of 95 percent of the vinyl ether of the said unsaturated alcohol with 5 percent of a vinyl ether of octodecyl alcohol | −22 | 12 | 45 | 185 |
| 0.2 percent of the same product | −23 | 10 | 22 | 59 |
| 0.1 percent of a polymerization product of a mixture of 90 percent of the vinyl ether of the said unsaturated alcohol with 10 percent of a vinyl ether of octodecyl alcohol | −22 | 10 | 20 | 80 |
| 0.2 percent of the same product | −23 | 8 | 18 | 50 |
| 1.1 percent of a high-molecular polymerization product of isobutylene | −8 | 300 | Ball does not fall | |
| The same addition together with 0.05 percent of the vinyl ether of oleic alcohol | −26 | 14 | 36 | 115 |
| The same addition together with 0.1 percent of this vinyl ether | −29 | 14 | 32 | 63 |
| The same addition together with 1.0 percent of this vinyl ether | −30 | 11 | 21 | 35 |

*Example 4*

The effect of the addition to benzine of polymerization products of vinyl ethers of unsaturated alcohols or of mixtures of such polymerization products with other substances or of polymerization products of mixtures of the said vinyl ethers together with other compounds is shown in the following table:

| Composition | Viscosity in degrees Engler at | |
|---|---|---|
| | 20° C. | 38° C. |
| Benzine without addition | 93 | 90 |
| Benzine with 0.1 percent of a polymerization product of the vinyl ether of oleic alcohol | 95 | 92 |
| Benzine with 0.5 percent of a polymerization product of the vinyl ether of oleic alcohol | 97 | 93 |
| Benzine with 1.0 percent of a polymerization product of the vinyl ether of oleic alcohol | 98 | 95 |

The said benzine boils between 65° and 95° C. and has a specific gravity of 0.70 at 20° C.

The polymerization product of the vinyl ether employed is prepared from an industrial oleic alcohol which due to the content of unsaturated alcohols has an iodine number of from 50 to 65.

As may be seen from the table the viscosity of the benzine becomes greater by the addition of the aforesaid polymerization products. This increase in the viscosity may vary with the temperature.

Similar effects are obtained when incorporating the said additions with other hydrocarbon mixtures such as illuminating oil or gas oil. Also hard or soft paraffin waxes may be improved by such additions, by which they become softer, are not liable to develop fissures and thereby become more suitable for the working up and for the preparation of various products, as for example of candles.

What we claim is:—

1. A hydrocarbon product having a viscosity at least as high as that of a lubricating oil and having incorporated therewith a viscosity improving proportion of a polymerization product of a vinyl ether of an unsaturated alcohol said polymerization product having a molecular weight of at least 1000.

2. A hydrocarbon product having a viscosity at least as high as that of a lubricating oil and having incorporated therewith a viscosity improving proportion of a polymerization product of a vinyl ether of an unsaturated alcohol said alcohol having a molecular weight corresponding to the fatty acids found in fats, said polymerization product having a molecular weight of at least 1000.

3. A hydrocarbon product having a viscosity at least as high as that of a lubricating oil and having incorporated therewith up to 10 per cent of a polymerization product of a vinyl ether of an unsaturated alcohol said alcohol having a molecular weight corresponding to the fatty acids found in fats, said polymerization product having a molecular weight of at least 1000.

4. A lubricating oil having incorporated therewith a viscosity improving proportion of a polymerization product of a vinyl ether of an unsaturated alcohol said alcohol having a molecular weight corresponding to the fatty acids found in fats, said polymerization product having a molecular weight of at least 1000.

5. A lubricating oil having incorporated therewith up to 10 per cent of a polymerization product of a vinyl ether of an unsaturated alcohol said alcohol having a molecular weight corresponding to the fatty acids found in fats, said polymerization product having a molecular weight of at least 1000.

CURT SCHUMANN.
EDUARD MUENCH.
HANNS UFER.